United States Patent

Holl

(10) Patent No.: US 6,428,120 B1
(45) Date of Patent: Aug. 6, 2002

(54) METHOD AND DEVICE FOR CONTROLLING A VEHICLE

(75) Inventor: Eberhard Holl, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/690,079

(22) Filed: Oct. 17, 2000

(30) Foreign Application Priority Data

Oct. 9, 1999 (DE) .......................................... 199 50 028

(51) Int. Cl.$^7$ ................................................. B60T 8/32
(52) U.S. Cl. ..................................................... 303/191
(58) Field of Search ....................... 303/3, 89, 2, 116.1, 303/139, 176, 191, 125, 193, 192, 135, 113.2, 68, 122.05, 115.2; 180/197, 287; 188/353; 701/5 A; 192/4 A, 70; 477/71, 92–94, 116, 195–197

(56) References Cited

U.S. PATENT DOCUMENTS 5,129,496 A 7/1992 Sigl et al.
5,676,434 A * 10/1997 Ichikawa ..................... 303/150
6,009,364 A * 12/1999 Wada ........................... 701/43

FOREIGN PATENT DOCUMENTS

DE 196 21 628 12/1997

* cited by examiner

*Primary Examiner*—Paul N. Dickson
*Assistant Examiner*—C T Bartz
(74) *Attorney, Agent, or Firm*—Kenyon & Kenyon

(57) ABSTRACT

A method and a device is described for controlling a vehicle. The method and device maintain a braking force of at least one wheel independent of a degree of actuation of a brake pedal at least when the vehicle is detected to be at a standstill. When a reduction condition exists, the braking force is reduced whereas, in response to a detected skidding of the vehicle, the braking force is reduced independently of the reduction condition. The method and device also provide measures for detection of a skidding of the vehicle and a danger of skidding.

18 Claims, 3 Drawing Sheets

METHOD AND DEVICE FOR CONTROLLING A VEHICLE

FIELD OF THE INVENTION

The present invention relates to a method and a device for controlling a vehicle.

BACKGROUND INFORMATION

U.S. Pat. No. 5,129,496 describes an automatic locking brake. When the brake pedal is actuated and the speed of the vehicle is less than a very small speed value, the braking pressure is locked up in the wheel brakes, i.e., maintained constant, by switching a valve, and is possibly additionally built up by actuating at least one pressure-generating means (pump). The locked-up braking pressure is reduced only when the driver starts off from rest.

German Patent No. 196 21 628 also describes an automatic locking brake (or hillholder) which, when the brake pedal is actuated and the vehicle is detected to be at a standstill, maintains, or possibly increases the braking force input by the driver. This function is deactivated when the driver releases the brake pedal.

In both approaches, the described function is activated as a function of at least the traveling speed, which is generated on the basis of at least one wheel speed signal. Therefore, it is problematic if a vehicle is erroneously inferred to be standing, for example, when the at least one wheel, whose speed signal is the basis for generating the traveling speed signal, locks up. In connection with the described locking brake function, the locked-up braking pressure or the maintained braking force are not reduced anymore. In corresponding friction coefficient conditions between the road surface and vehicle in the short term, or in the case of a large road gradient also in the long term, this results in that, in the extreme case, the vehicle is no longer steerable since the wheels lock up and the driver cannot reduce the braking force at these wheels anymore. This danger exists primarily if the reduction in braking force of the automatic locking brake is performed only after a preselected time elapses subsequent to the release of the brake pedal, or especially, if the deactivation is performed only during starting from rest. The above-described driving situation is particularly critical if it arises in speed ranges, for example speeds lower than 8 km/h, in which an anti-lock controller does not intervene.

SUMMARY

An object of the present invention is to improve an automatic locking brake function or a hillholder with respect to the above-described situation. A further object of the present invention is to provide measures that allow the skidding of a vehicle to be estimated from the vehicle behavior.

In an advantageous manner, an automatic locking brake function and/or a hillholder function, which is activated, inter alia, when a vehicle is at a standstill, is improved in that the function is deactivated immediately in response to detected skidding of the vehicle to restore the steerability of the vehicle.

It is advantageous that, when a danger of skidding exists and the brake pedal is released while the function is activated, brake pressure is immediately reduced in at least one wheel while at other vehicle wheels, which are not affected by the reduction in braking force, the braking force is increased so that the automatic locking brake function or the hillholder function is not impaired in the case that an actual skidding does not exist.

In a simple and reliable manner, to detect the skidding, braking force is reduced, for example, at one wheel upon the release of the brake pedal, and it is checked whether the one wheel starts up again, i.e., whether its wheel speed increases. If this is the case, then a skidding situation of the vehicle exists that results in an immediate deactivation of the hillholder or the automatic locking brake function.

In another embodiment, skidding is advantageously detected in that, in the case of an automatic locking brake function or hillholder function, not all the wheels of the vehicle are braked. In this manner, it is possible to check only the starting up of the unbraked wheels to detect skidding.

The estimation of a danger of skidding is performed without any additional sensor technology. A danger of skidding is advantageously assumed when an estimated coefficient of friction falls below a limiting value. In this context, the coefficient of friction is estimated on the basis of quantities representing braking forces in response to a decrease of at least one wheel speed. Extensive sensor technology is not necessary.

The road gradient may be taken into account during the determination of the danger of skidding. Along the lines of the above, the road gradient is ascertained on the basis of signals representing braking forces (e.g., brake pressures) and a vehicle deceleration quantity. In this manner, the accuracy of skidding danger detection is improved.

A skidding danger may be assumed when the estimated coefficient of friction is smaller or only slightly greater than the required coefficient of friction, which may be ascertained as a function of the estimated gradient. Additionally or alternatively, skidding danger may always assumed when a preselected friction coefficient level fails to be met again, independently of the gradient so that skidding danger is always detected even in difficult conditions.

In another embodiment, as an alternative or in addition to the above measures, a skidding danger may always be inferred when a traction control occurs at low speeds including a subsequent vehicle standstill.

In an advantageous manner, the described procedure is not only implemented in connection with a hydraulic braking system but also with an electrohydraulic, an electropneumatic for an electromotive braking system.

It is expedient for the reduction in braking force, for detection of skidding during the existence of a danger of skidding to be performed not as a function of the release of the brake pedal, but to have already been performed at the beginning of the activation of the function during the vehicle standstill. If skidding is detected, then the driver's desire is given priority, and the braking force input by the driver is taken as a basis for the control of the wheel brake, i.e., the locking brake function or the hillholder are deactivated.

It is advantageous if, to detect skidding, braking force is reduced not only at one but at several wheels, for example, at an entire axle. In this case, it is an advantage that this measure, for example in the case of a hydraulic braking system equipped with a driving dynamics control, takes place silently.

DETAILED DESCRIPTION

Figure 1:
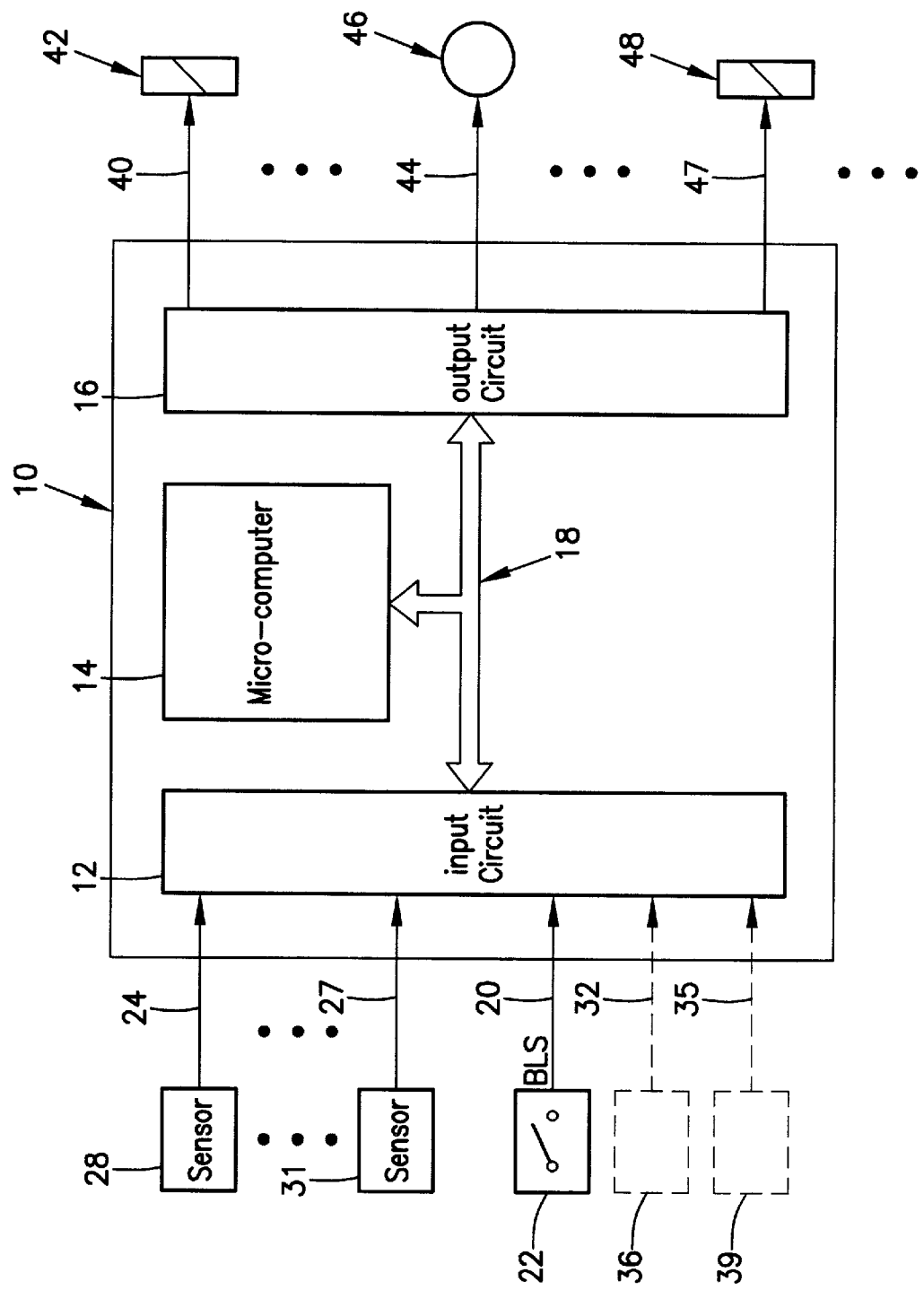
FIG. 1 shows a control device for a braking system of a vehicle.

FIG. 1 shows a control device 10 for controlling the braking system of a vehicle. This control device 10 includes an input circuit 12, at least one microcomputer 14, and an output circuit 16. Input circuit 12, microcomputer 14, and output circuit 16 are interconnected for mutual data exchange via a communication system 18. Led to input circuit 12 are input lines from different measuring devices, which in an advantageous embodiment are combined in a bus system, for example, CAN. A first input line 20 leads from a brake pedal switch 22 to control unit 10, and communicates a brake pedal switch signal BLS thereto. Input lines 24–27 connect control unit 10 to wheel speed sensors 28–31 via which signals with regard to the speeds of the wheels of the vehicle are supplied. In an advantageous embodiment, moreover, provision is made for input lines 32–35, which transmit signals with regard to the pressure in the wheel brakes or with regard to the exerted braking force from corresponding measuring devices 36–39.

At output circuit 16 of control unit 10, output lines are mounted that trigger control elements for controlling the wheel brakes of the vehicle. In the advantageous embodiment, the braking system is a hydraulic braking system so that output lines 40 lead to valves 42 for controlling the braking pressure in the wheel brakes, whereas at least one pressure-generating means 46 (pump) is controlled via output line 44 for the individual brake circuits. In the advantageous embodiment, at least one control valve 48, which maintains the braking pressure constant in at least one wheel brake along the lines of the described hillholder function when the brake pedal is actuated, is triggered via output line 47. In the advantageous embodiment, this at least one control valve is the switch-over valve which is provided for performing the traction control, and which interrupts the connection between master brake cylinder and wheel brakes.

In addition to using the present invention in hydraulic braking systems, the present invention also may be used with the corresponding advantages in pneumatic braking systems or in electrically controlled braking systems (electrohydraulic, electropneumatic or electromotive braking systems or a mixture of these types). In the case of wheel brakes which feature electromotive brake application, the braking force or a braking torque is adjusted via electrical control signals instead of the braking pressure.

In another advantageous embodiment, control device 10, microcomputer 14, performs at least a traction control and, possibly additionally, a driving dynamics control while controlling the braking system of the vehicle. Closed-loop controls of this type are conventional. Moreover, hillholder function is provided as an additional function. The hillholder function, which in addition to a locking-brake effect, is also used as hill-start aid for manual transmission vehicles and as creep suppression for automatic transmission vehicles. When working with such a hillholder function, in principle, the braking pressure input by the driver is locked up in the braking system (in other braking systems, the exerted braking force is maintained, respectively) in response to a signal using valve control inputs, and is reduced again in specific conditions. The activation signal for the hillholder function is derived at least from a vehicle standstill detection. An example of such a vehicle standstill detection is described in the above-mentioned patents. While the hillholder is active, the pressure is locked up in the wheel brake cylinders. The braking pressure or the braking force is reduced when a reduction condition exists, such as after a specific period of time has elapsed subsequent to the release of the brake pedal, or, in another embodiment, when a desire of the driver to start off from rest is detected.

Since the standstill of the vehicle is derived on the basis of wheel speed signals, skidding of the vehicle involving at least locked-up non-driven wheels results in a locking up of the braking pressure if the remaining activation conditions exist. This state cannot be distinguished from the vehicle state standstill. Thus, if the locking brake is activated while the vehicle skids with locked-up wheels, the driver cannot reduce the braking force, and depending on the execution, the braking pressure cannot (only in a starting-off process) or only after the elapse of a time condition be reduced again even subsequent to the release of the brake pedal. During this time, the vehicle is not steerable despite the release of the brake, which in inhomogeneous friction coefficient conditions, can even result in unwanted spinning of the vehicle. The only way for the driver to restore the steerability would be the deactivation of the hillholder, depending on the execution, for example by a brake-pedal, gear, or control switch actuation, or after a time has elapsed subsequent to the release of the brake pedal.

As described in the following, a danger of skidding is detected on the basis of selected signals, and the hillholder or the locking brake function are immediately deactivated in response to a detected skidding to restore the steerability. The skidding detection is essentially performed in two phases. In an advantageous embodiment, in the first phase, a danger of skidding is estimated from the quantities for the wheel speeds, the wheel-braking pressures or the braking forces or torques (estimated or measured), the vehicle deceleration, and/or the marks indicating an active anti-lock controller and/or traction controller. In the case of a detected danger of skidding, upon the completed activation of the hillholder or of the locking brake, the pressure is substantially reduced, for example at one wheel (e.g. a non-driven wheel, for example a wheel running at a low coefficient of friction). If this wheel starts up, then an actual skidding situation exists. In this context, in the case of a hydraulic braking system, the reduction in pressure is carried out by opening an outlet valve and relieving the pressure into a storage chamber. In the advantageous embodiment, the reduction in pressure is performed, activating a pump so that pressure is increased in the second wheel of the circuit of the wheel in which pressure is reduced. In this manner, the loss of braking force due to the reduction in pressure is compensated for again while emptying the storage chamber at the same time.

To determine the danger of skidding in a first embodiment, in response to a plunge of one or several wheel speed signals, i.e., in response to a suddenly occurring decrease of the wheel speed signal or wheel speed signals until the detection of the locking or the standstill of the wheel or of the wheels, the coefficient of friction between road surface and wheel is inferred from the then prevailing braking-force or braking-pressure level if the locking brake function is activated. If the braking-force level at the plunge of the wheel speed signal is relatively high, a high coefficient of friction is inferred, a low coefficient of friction being inferred in the opposite case. In an advantageous embodiment, moreover, the road gradient is estimated on the basis of quantities for the vehicle deceleration and for the exerted braking forces (braking pressures). In the process, a specific angle of inclination is derived from the ratio of braking forces and vehicle deceleration.

Furthermore, a required friction coefficient level is preselected, which in an advantageous embodiment, is determined from a table or from a characteristic curve as a function of the estimated gradient. If the estimated friction coefficient level lies below or only slightly above the required friction coefficient level, a danger of skidding is assumed, and the above-described procedure for determining an actual skidding is activated. In addition or as an alternative to this procedure, skidding danger is always assumed below a preselected (minimum) friction coefficient level, independently of the estimated gradient so as not to overlook skidding danger situations because of estimation errors in the gradient. To detect the plunging of at least one wheel, the behavior of the wheel speed signal in relation to a reference speed is ascertained. When generating the reference speed, allowance, for example, is made for braking and engine torques.

Using these measures, a danger of skidding is detected when the driver, by braking on an uphill or downhill grade, forces the wheels to lock in a speed range below which the anti-lock controller usually does not start controlling. If the vehicle, being controlled by the anti-lock controller, comes to a standstill on an uphill grade, then, in lieu of the individual braking force level, the friction coefficient level is derived from the mean braking-force or braking-pressure level of the wheels in response to the plunge of the wheel speed.

If the vehicle comes to a standstill on an uphill grade under a traction control, then, contrary to the above, a danger of skidding is inferred from the occurrence of the traction control at low speeds involving a subsequent vehicle standstill. This covers the case that the driver does not advance on an uphill grade due to the friction coefficient conditions.

To determine the road gradient, in lieu of the above described method, a direct measurement using a gradient sensor or using a longitudinal acceleration sensor can be utilized.

If the danger of skidding is already detected, according to one of the above procedures, at the beginning of the activation of the hillholder, then a reduction in pressure can already be performed at this point in time in response to a detected skidding so as to give the driver's desire priority. In this case, it is not required for the brake to be released.

In another alternative, in stopping processes during a hillholder activation, the braking force is generally not maintained or the braking pressure not locked up in all wheels. The skidding detection is then reduced to detect the starting-up of the unbraked wheels, i.e., a skidding is assumed if the speed of a wheel increases again.

In the advantageous embodiment, the described procedure is implemented as a computer program of the microcomputer of the control device. An example of such a program is depicted in FIGS. 2 and 3 by way of flow charts.

Figure 2:
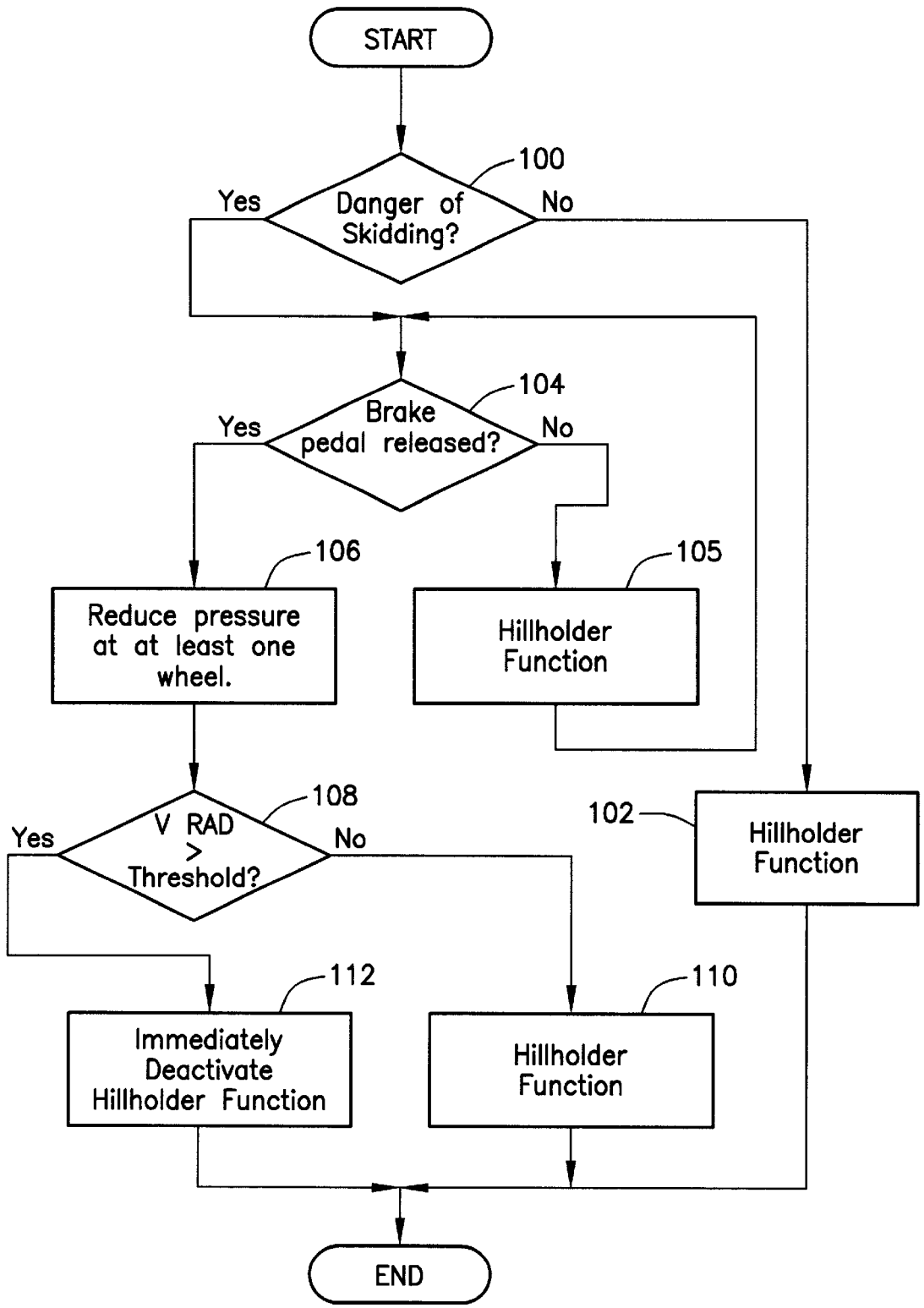
FIG. 2 shows a first flow chart of measures executed in a computational unit of a control device in response to a detection of a danger of skidding.

The program shown in FIG. 2 is run through at predefined points in time while the hillholder function is activated. Initially, it is ascertained in first step 100, for example on the basis of a set or non-set mark, whether a danger of skidding exists. If this is not the case, the hillholder function is continued in accordance with step 102 in a manner corresponding to the conventional procedure, and the program is terminated. If a danger of skidding is detected in step 100, then it is checked in step 104 whether the brake pedal is released. If the brake pedal is not released, then the normal hillholder function (step 105) is performed, and the program returns to step 104. If the brake pedal is released, then the pressure is reduced at at least one wheel in accordance with step 106. Thereupon, it is checked in step 108 whether the wheel speed of this wheel, after a certain time, has become greater than zero. If this is not the case, since no actual skidding condition exists, the hillholder is continued in accordance with step 110 as within the normal functional scope. If an increase of the wheel speed is detected, the hillholder is deactivated immediately in accordance with step 112. Subsequent to step 112, the program is terminated and run through anew at the next activation of the hillholder.

Figure 3:
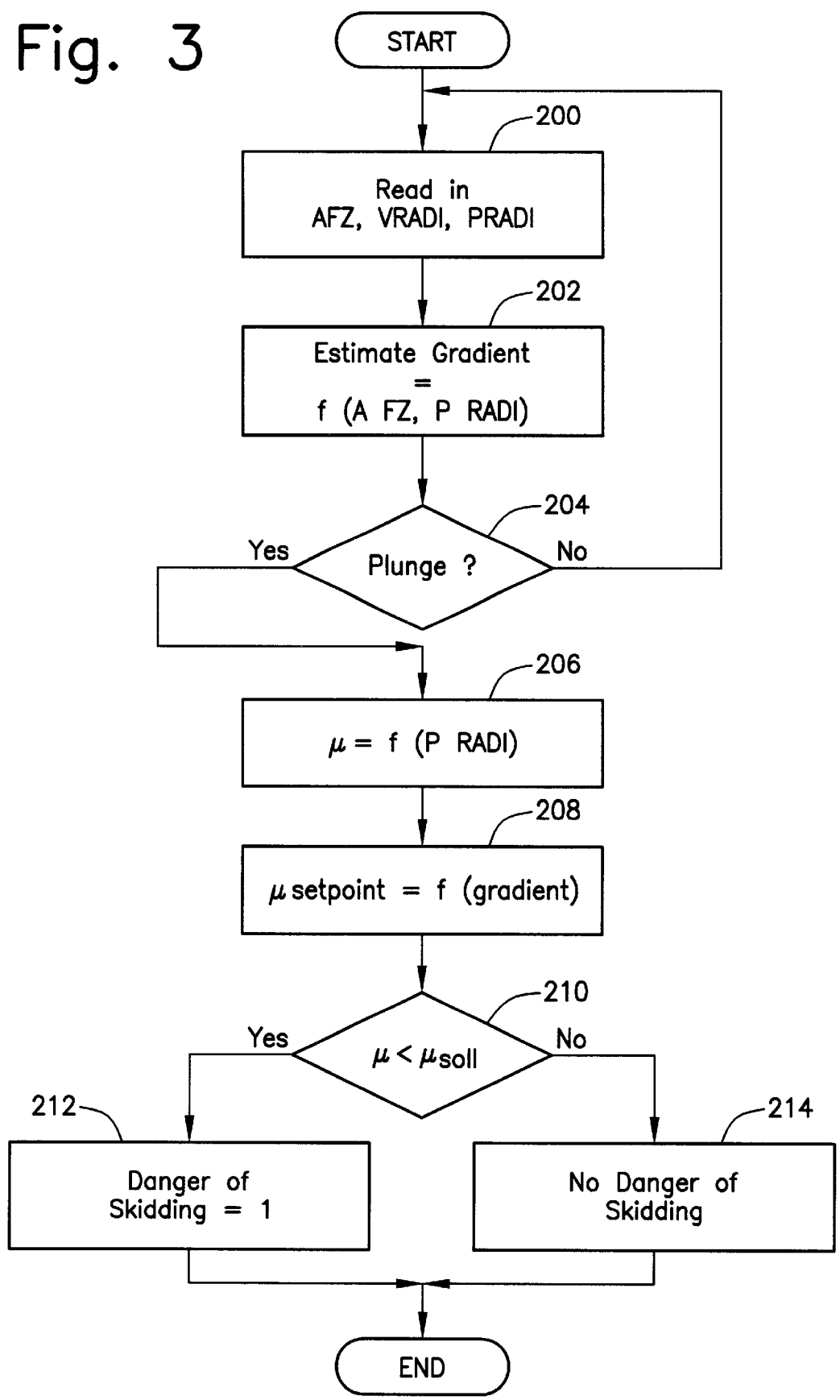
FIG. 3 shows a second flow chart for detection of a skidding danger executed in a computational unit of a control device.

FIG. 3 shows an advantageous embodiment of a flow chart for the determination of the danger of skidding. This program is run through at predefined points in time during a braking process. Initially, vehicle deceleration AFZ (which is generally calculated from wheels speeds Vradi), wheel-braking pressures PRADI, and wheel speeds VRADI are read in in first step 200. Next, in step 202, the road gradient is estimated as a function of the vehicle deceleration and the wheel-braking pressures (on the basis of the sum of the wheel-braking pressures). In step 204, it is checked whether at least one wheel speed plunges, i.e., whether it departs from the reference speed very quickly or whether a lock-up tendency of the wheel is detected. If this is not the case, then the program is repeated at the next point in time at step 200. If a plunging wheel speed is detected, then coefficient of friction $\mu$ is determined as a function of the currently prevailing braking pressure in the brake of the wheel at this point in time. Next, in step 208, for example on the basis of a characteristic curve, required coefficient of friction $\mu$setpoint is determined on the basis of the road gradient ascertained in step 202. In next step 210, the estimated coefficient of friction is compared to the required coefficient of friction. If the coefficient of friction is smaller than the required coefficient of friction, the mark for the danger of skipping is set in accordance with step 212; in the opposite case, it is reset in accordance with step 214. Thereupon, the program is terminated and run through anew during the next braking process. In the exemplary embodiment of FIG. 3, the determination of the coefficient of friction during anti-lock braking system operation on the basis of the mean braking-force or braking-pressure level, and the derivation of the danger of skidding from a traction control operation, are not taken into account. Depending on the execution, these variants are used in addition or as an alternative to the above procedure, and are implemented within the scope of comparable programs as shown in FIG. 3.

In lieu of or in addition to the initiation of the depicted control of the wheel brakes, the procedure for detecting a danger of skidding is used in an advantageous embodiment for other interventions in other control systems of the vehicle, for example, engine management, transmission control, etc., for example, to prevent wheel slip as a result of the engine drag torque.

What is claimed is:

1. A method for controlling a vehicle, comprising:
    at least when the vehicle is detected to be at a standstill, maintaining a braking force at at least one wheel of the vehicle independent of a degree of actuation of a brake pedal;
    reducing the maintained braking force when at least one reduction condition exists; and
    in response to a detected skidding of the vehicle, reducing the maintained braking force independent of the at least one reduction condition.

2. The method as recited in claim 1, wherein:
    the at least one reduction condition is an elapse of a time subsequent to a release of the brake pedal.

3. A method for controlling a vehicle, comprising:
at least when the vehicle is detected to be at a standstill, maintaining a braking force at at least one wheel of the vehicle independent of a degree of actuation of a brake pedal;
reducing the maintained braking force when at least one predefined condition exists, the at least one predefined condition including an elapse of a time subsequent to a release of the brake pedal; and
determining a skidding of the vehicle, the skidding being determined by performing the following steps:
  i) reducing the maintained braking force at at least one wheel to determine vehicle skidding, and
  ii) at least one of:
    inferring vehicle skidding if a speed of the at least one wheel changes, and
    detecting vehicle skidding as a function of a behavior of wheel speeds of wheels.

4. The method according to claim 3, wherein:
the determining the skidding step is only performed in response to a detected danger of vehicle skidding.

5. The method according to claim 1, further comprising the step of:
in a hydraulic braking system, reducing a pressure by opening outlet valves to reduce the maintained braking force.

6. The method according to claim 1, further comprising the step of:
reducing a pressure by starting a pump to reduce the maintained braking force.

7. A method for controlling a vehicle, comprising:
intervening in control of the vehicle in response to a detected danger of skidding; and
apart from whether an actual skidding is present, determining a danger of skidding at least one of:
  when an estimated coefficient of friction falls below a required coefficient of friction,
  from an occurrence of a traction control at low speeds involving a subsequent vehicle standstill, and
  from a behavior of a speed of unbraked wheels.

8. A method for controlling a vehicle, comprising:
intervening in control of the vehicle in response to a detected danger of skidding;
determining a danger of skidding at least one of:
  when an estimated coefficient of friction falls below a required coefficient of friction,
  from an occurrence of a traction control at low speeds involving a subsequent vehicle standstill, and
  from a behavior of a speed of unbraked wheels; and
determining the estimated coefficient of friction as a function of a wheel-braking force of a plunging wheel in response to a sudden decrease in a wheel speed of the plunging wheel.

9. The method according to claim 8, wherein:
the required coefficient of friction is dependent on a road gradient.

10. The method according to claim 9, further comprising: one of:
  estimating the road gradient by a sensor, and
  estimating the road gradient as a function of vehicle deceleration and the wheel-braking force.

11. The method according to claim 7, further comprising:
in response to the detected danger of skidding, reducing a braking force at several wheels to prevent vehicle skidding.

12. The method according to claim 11, wherein:
the several wheels include all wheels of an axle.

13. The method according to claim 7, further comprising:
controlling a wheel brake in one of an electrohydraulic manner, an electropneumatic manner, and an electromotive manner.

14. A device for controlling a vehicle, comprising:
at least one control unit adapted to:
  maintain a braking force at of least one wheel of the vehicle independent of a degree of brake pedal actuation at least when the vehicle is detected to be at a standstill, and
  reduce the maintained braking force when at least one predefined condition exists, the at least one control unit including a reducing device configured to reduce the braking force in response to a detected skidding of the vehicle, independently of the at least one predefined condition.

15. A device for controlling a vehicle, comprising:
a control unit adapted to intervene in control of the vehicle in response to a detected danger of skidding, the control unit including a deriving device configured to determine, apart from whether an actual skidding is present, a danger of skidding when there is at least one of the conditions:
  when an estimated coefficient of friction falls below a required coefficient of friction,
  from an occurrence of a traction control at low speeds involving a subsequent vehicle standstill, and
  from a behavior of speeds of unbraked wheels.

16. A device for controlling a vehicle, comprising:
at least one control unit adapted to:
  maintain a braking force of at least one wheel of the vehicle independent of a degree of actuation of a brake pedal at least when the vehicle is detected to be at a standstill, and
  reduce the maintained braking force when at least one predefined condition exists, the at least one predefined condition including an elapse of a time subsequent to a release of the brake pedal; and
an arrangement configured to reduce the braking force in at least one wheel to detect vehicle skidding, the arrangement further configured to at least one of:
  infer vehicle skidding if a speed of the at least one wheel changes, and
  detect vehicle skidding as a function of a behavior of wheel speeds of unbraked wheels.

17. A method for controlling a vehicle, comprising:
intervening in control of the vehicle in response to a detected danger of skidding;
determining a danger of skidding at least one of:
  from an occurrence of a traction control at low speeds involving a subsequent vehicle standstill, and
  from a behavior of a speed of unbraked wheels.

18. A method for controlling a vehicle, comprising:
intervening in control of the vehicle in response to a detected danger of skidding;
determining a danger of skidding at least one of:
  when an estimated coefficient of friction falls below a required coefficient of friction,
  from an occurrence of a traction control at low speeds involving a subsequent vehicle standstill, and
  from a behavior of a speed of unbraked wheels, wherein:
  the required coefficient of friction is dependent on a road gradient.

* * * * *